April 8, 1969          H. H. RICHTER          3,436,835
TEXTILE SPINDLE
Filed Oct. 22, 1965
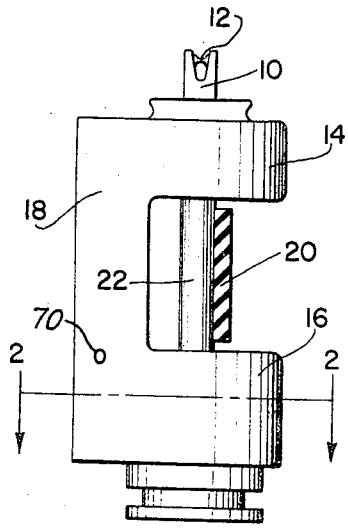
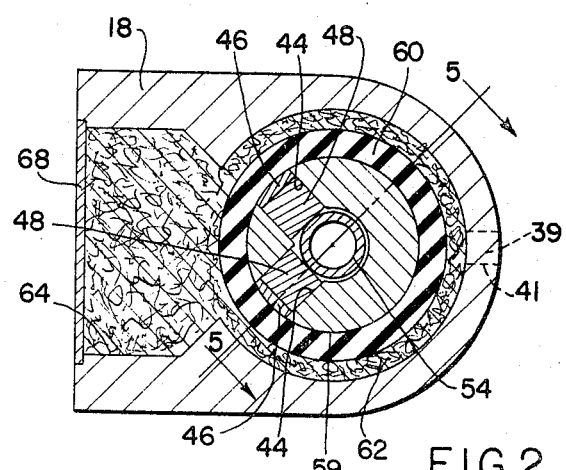
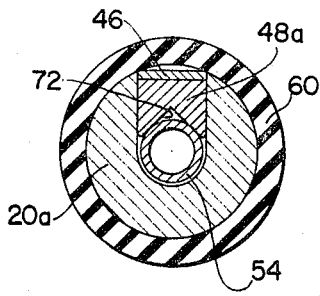
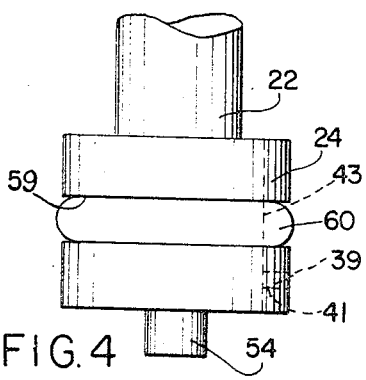
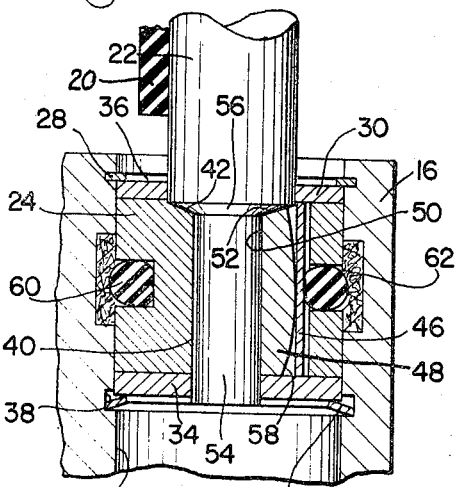
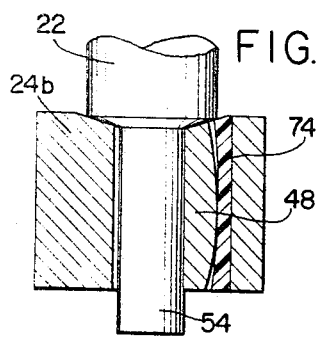
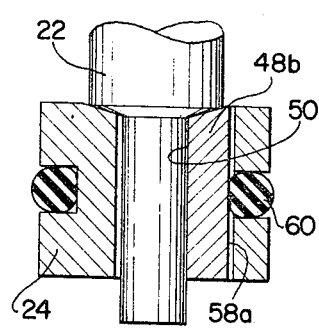
INVENTOR.
HANS H. RICHTER
BY
ATTORNEYS

United States Patent Office 3,436,835
Patented Apr. 8, 1969

3,436,835
TEXTILE SPINDLE
Hans H. Richter, Cranston, R.I., assignor to Leesona Corporation, Warwick, R.I., a corporation of Massachusetts
Filed Oct. 22, 1965, Ser. No. 501,141
Int. Cl. F16c 35/08, 35/00
U.S. Cl. 308—26          5 Claims

ABSTRACT OF THE DISCLOSURE

High speed textile spindle apparatus and a bearing for journalling a high speed spindle. The bearing retains the spindle against axial movement and journals it on bearing pads received in slots in a bearing mount for axial rocking and radial movement of the pads relative to the spindle to compensate for eccentricities in the spindle, with the pads resiliently urged against the spindle to dampen spindle vibration. A drive belt urges the spindle against the pads and free of the bearing mount.

---

This invention relates generally to high speed textile spindle apparatus and, specifically, relates to such apparatus permitting greatly increased speeds of spindle rotation with markedly reduced vibration and attendant wear.

One variety of textile spindle apparatus is disclosed in the commonly assigned U.S. patent to Richard G. Hilbert, No. 3,044,247 issued July 17, 1962. The instant invention is an improvement over the various bearing constructions disclosed therein as well as other forms known to the inventor.

It is a recognized phenomenon that rotating shafts, regardless of painstaking manufacture, do not run perfectly true although, of course, the degree of eccentricity is dependent upon the care taken during the manufacturing process. Vibration and consequent wear are undesirable effects resulting from shaft eccentricities and in certain applications may be totally unacceptable unless they are held checked or in some manner compensated for. When employed in false twist applications in which spindle speeds up to and in excess of 500,000 r.p.m. are not uncommon, even slight vibrations occurring at decreased rotational speeds between the spindle and its supporting bearings are greatly magnified at the ultra-high speeds attained during normal operation.

The bearing herein disclosed permits a considerable increase over conventional spindle speeds while maintaining vibration and resulting spindle wear at acceptable levels. In brief terms, this is accomplished by resilient means which urge bearing pads or segments into continuous engagement with the bearing surfaces of the spindle. However, as the spindle rotates, the resilient means retract or distend in accordance with the eccentricity thereof to thereby maintain a uniform bearing pressure on the spindle and resulting in reduced vibration and uniform, though negligible wear.

Accordingly, it is an object of the present invention to provide a new and improved high speed spindle apparatus and bearing assembly which will considerably reduce vibration and wear.

Another object of the invention is the provision of a new and improved spindle apparatus bearing assembly which includes resilient means for constantly urging bearing assembly pads into continuous positive engagement with the bearing surfaces of the spindle during spindle operation.

A further object is to provide a new and improved spindle apparatus bearing assembly which will assure uniform wear on the bearing surfaces of a spindle supported for rotation therein.

Other and further objects will become apparent from a reading of the specification which follows, taken together with the drawings in which like numbers refer to like elements throughout.

In the drawings,

FIG. 1 is a side elevation view, partly in section, and illustrative of a false twist spindle apparatus incorporating the subject matter of the invention;

FIG. 2 is a view in section taken along lines 2—2 of FIG. 1;

FIG. 3 is a sectional view similar to that of FIG. 2 but showing a modified structure;

FIG. 4 is a side elevation view of an improved bearing mounting a spindle for rotation therein;

FIG. 5 is a view in section taken along lines 5—5 of FIG. 2;

FIG. 6 is a view similar to FIG. 5 showing a modified form of the invention; and FIG. 7 is also a view similar to FIG. 5 showing a further modification of the invention.

With particular reference to the drawings, FIG. 1 discloses a high speed spindle apparatus, including a false twist spindle 10 similar to that of the aforementioned Hilbert patent and having the usual yarn engaging twist-trapping pin 12 formed at the upper end thereof. Spindle 10 is rotatably supported in bearings, to be described shortly, which are mounted in ears 14 and 16 of spindle housing 18. The latter is carried in a usual spindle mount (not shown) but which is well known in the art. A drive belt 20 is translated at high speed in the customary manner so as to transmit rotational movement to the whorl 22 of the spindle.

As best seen in FIG. 5, a generally cylindrical-shaped bearing mount 24 which is fabricated from a porous material, for example, sintered bronze or the like, is received within bore 26 of ear 16. The internal construction of ear 14 is similar to that of ear 16 and hence will not be described. Inwardly of housing block 18, i.e., in the direction of the central opening between ears 14 and 16, bearing mount 24 is held in bore 26 by means of a split retaining ring 28, an annular washer 30 being disposed between the ring and the mount to seal the latter from dust and the like. Towards the outer end of the bore, mount 24 is held against axial movement by means of a bowed or dished retaining ring 32, an annular spacing washer 34 again being provided between the ring and the mount as a dust shield and also to transmit thrust from the mount 24 to the housing block 18. The retaining rings 28 and 32 engage internal grooves 36 and 38, respectively, provided for that purpose in the walls of the bore. It is necessary that bearing mount 24 be accurately positioned in azimuth as well as axially with respect to the bore 26 and to this end, a positioning pin 39 is fitted within a small cylindrical passage 41 extending transversely to the axis of said bore through the annular wall of ear member 16 (see FIG. 2). The internal end of the pin 39 engages a recess 43 provided in the outer surface of mount 24.

The bearing mount 24 has a small central axially directed bore 40 coaxial with housing bore 26, the uppermost end (FIG. 5) of bore 40 being upwardly flared at a relatively large acute angle as at 42. Two substantially identical slots or channels 44 (see FIG. 2) are cut into the internal wall of each mount bore 40, extending longitudinally the full length of the wall, with their axes parallel to the bore axis, and radially into the wall a distance equal to approximately one-half the radial thickness of mount 24. There is disposed against the bottom wall of each slot 44 a thin metal strip or plate 46 roughly coterminous with the slot. As can be best seen in FIG. 2, the two slots in each mount 24 are preferably arranged with their center lines spaced 90° from each other and 135° from the line of tangency of drive belt 20 on spindle blade 10.

The recesses or slots 44 are adapted to receive identical bearing segments 48 which, disposed in pairs in the bearing mount 24, constitute journals for the reduced end portions of spindle blade 10. Segments 48 are formed of hard wear-resistant material, pure carbon, precious stones of natural or synthetic origin, such as sapphire, or the like, although highly wear-resistant metal can be substituted where increased frequency of replacement is permissible. Each of the segments is roughly in the shape of a truncated, right angular, rectangular prism having a total of six sides. The two adjacent sides 50 and 52 constitute planar bearing surfaces receiving the bearing load of the reduced end portion 54 and tapered shoulder 56 of spindle blade 10. The lesser of these two slides, 52, intersects with the greater, 50, at an obtuse angle approximately equal to that at which the ends of mounting bore 40 flare outwardly and complementarily with the taper of shoulder 56. Side 58, opposite side 50, has a larger convex radius of curvature and is adapted to seat against the metal strip 46 in the bottom of recess 44. The curvature of this side 58 permits the segment to align itself in the recess with its bearing faces in proper contact with the corresponding surfaces of the spindle blade and avoids the necessity of forming the two opposite greater sides in exact parallel. Due to its curvature, side 58 can have only theoretical line contact with any plane surface against which it abuts, and the function of metal plate 46 is to receive the concentrated load from the curved rear face of the segment and to transfer it onto the resilient member 60 to be described, or in the extreme condition, to distribute it over the bottom of the radial recess in the porous amount.

The longitudinal and transverse dimensions of the segments 48 are such that they are not wholly received within the recesses 44 but rather have their greater bearing faces 50 extending chordally with respect to the mount bore 40. This insures that the bearing load is borne by the segments rather than the internal surface of the bore. The diameter of the mount bores is sufficiently greater than that of the reduced end portion 54 of spindle blade 10 that a discernible exists between the spindle surface and the surface of the bores.

Around the periphery of bearing mount 24 is formed a recess or groove 59 having a depth approximately equal to one-half of the radial thickness of said mount. Thus, it will be appreciated that each of the channels 44 opens into and communicates with groove 59. An O-ring 60 of rubber or like resilient or expansible material is suitably fitted within the confines of groove 59 and engages the surfaces of metal strips 46 to urge them out of contact with the bottom walls of recesses 44 and against segments 48.

When the spindle is inactive, there is a small amount of lateral "play" in said spindle. However, rotational driving force, for instance of belt 20, is transmitted to the spindle blade 10 in such a way as to urge the spindle blade end portion 54 into contact with the radial bearing surfaces 50 of the cooperating parts of the segments 48 and away from the internal surface of mount bore 40. The force urging spindle blade end portion 54 into engagement with the bearing surface 50 of segments 48 is in turn transmitted through metal plate 46 to O-ring 60. Thus, as shaft 10 rotates, segments 48 and their associated metal strips 46 are slidable within their slots or channels 44 to the end that the segments are always maintained in intimate contact with end portion 54 of spindle 10. For example, at one point in its rotation, a segment 48 may be urged outwardly against the bias of resilient O-ring 60 by the eccentricity of spindle end portion 54; at another point in its rotation, a segment may be urged inwardly by said resilient O-ring to maintain engagement thereof on said reduced end portion. With both of the segments acting mutually, the reduced end portion 54 is maintained in engagement with bearing surfaces 50 by O-ring 60 throughout its rotational travel. Because the segments yield in response to variations in the radius of the rotating spindle and, yet, are held in intimate contact with end portion 54 by O-ring 60, vibration is effectively damped, shock on the bearings is absorbed and wear on the reduced end portion is negligible.

From the foregoing description, it will have been comprehended that each cooperating pair of segments 48 define a combination V-type radial and thrust bearing. The radial load is transmitted from the spindle 10 through the reduced end portion 54, segments 48, load distributing plates 46, and resilient O-ring 60, to bearing mount 24 and thence to the housing block 18. The inclined segment bearing faces 52 receive from the tapering spindle shoulders the axial thrust in either direction of the spindle and transmit the thrust through washer 32 and retaining ring 34 directly to the housing. While the radial bearing faces 50 of each pair of segments are preferably arranged at a right angle to each other, a different angle can be used in lieu thereof.

The lubrication system for the segment bearing may be such as disclosed in the above-cited Hilbert patent. As explained therein, the usual practice of allowing the rotating members to have direct contact with a lubricant cannot be followed since direct contact with lubricants at the speeds discussed would actually have a retarding effect on spindle rotation. It has been found that satisfactory lubrication can be obtained by having the spindle rotate in spaced, non-contacting relationship with material permeated by lubricating oil. In this way, positive contact between the lubricant and rotating spindle surfaces is avoided but a sufficient amount of the oil or oil vapor is picked up by the rotating spindle surfaces, possibly due to their high speed relative to the stationary oil-permeated mass, to effectively lubricate blade end portions.

The above-described feature is accomplished in the present invention by providing the generally cylindrical porous bearing mount 24 with access to a supply of lubricating oil in order that the mount may be become permeated by such oil. As can been seen in FIGS. 2 and 5, such access is obtained by forming in the wall of bore 26 an annular recess 62 extending into housing ear 16. The annular recess 62 is in communication with an oil reservoir chamber 64 formed in the back portion of housing 18. Annular recess 62, and preferably the reservoir chamber 64 as well, are filled with oil-absorbent felt or other suitable material, indicated at 66, the presence of the felt retarding the flow of oil through the sintered bearing mount 24 and tending to prevent a condition of over-lubrication. Chamber 64 may be conveniently obtained by drilling into the back portion of housing 18 from the rear face thereof and pressing a plug 68 into the end of the opening.

Any appropriate means may be provided for filling the oil reservoir chambers, such as by a passageway 70 (see FIG. 1) formed in the side of ear 16 and extending downwardly and inwardly into communication with chamber 64. The appropriate lubricant directed into passageway 70 will flow under the effect of gravity into the reservoir chamber.

A preferred embodiment of the invention now having been disclosed, a number of variations will now be described, all of course, lying within the general scope of the invention.

FIG. 3 illustrates an embodiment wherein the two segment bearing construction of FIG. 2 has been replaced by a single segment bearing 48a albeit one having a pair of faces 72, each of which is formed to be tangential with spindle reduced portion 54. A single plate 46 is located between segment 48a and O-ring seal 60 and serves the identical function as in the earlier described construction.

FIG. 6 is illustrative of yet another embodiment wherein the bearing mount 24b is formed without the peripheral groove and its associated O-ring. Further, the metal plate 46, described in connection with the previous embodiments, has been replaced with a pad 74 of rubber or other suitable expansible or resilient material which rests against the bottom wall of each channel 44 in a manner similar to said plate. Each segment 48 is received in contacting engagement on its associated pad 74 which serves the same purpose provided by the O-ring of the earlier embodiment, viz., it provides a resilient mount for the segment bearings 48 whereby the latter are held in continuous engagement on the surface of the shaft rotating in bore 40 while simultaneously allowing for slight eccentric variations therein without the attendant difficulties of vibration and excessive wear.

A final version of the segment bearing is provided in FIG. 7 wherein segment 48b is provided with a substantially flat face 58a adjacent to O-ring 60 and wherein plate 46 of the previous embodiments has been eliminated. The clearance between said flat face 58a and the bottom of channel 44, by reason of O-ring 60 bearing against segment 48b, is sufficient to permit the latter to rock about the O-ring as a fulcrum, so that face 50a might bear fully against reduced portion 54 of spindle 10. In all other respects, the embodiment of FIG. 7 operates similarly to that of FIGS. 2 and 5.

What is claimed is:

1. A high speed textile spindle apparatus comprising a textile spindle having a generally cylindrical blade portion, said spindle capable of rotation at high speeds, a drive belt in contact with one side of said spindle blade for driving said spindle at said high speeds, two bearing means each providing two bearing surfaces in circumferentially spaced tangential contact with the opposite side of said spindle blade, each of said bearing means having a convex surface opposite said bearing surfaces, said two bearing means spaced apart such that the aforesaid contact between the spindle and drive belt is located in an area of the spindle blade generally between said two bearing means, bearing mounts having generally cylindrical shaped bores for receiving said spindle, slots formed in said bores, said bearing means housed in said slots, and resilient means communicating with the center portion of said convex surface, whereby radial loads such as result from contact between the spindle blade and drive belt are transmitted from the spindle through the bearing means and resilient material to the bearing mount.

2. Apparatus as set forth in claim 1 in which each of said slots opens into an outer surface of said mount, said resilient means located along said outer surface communicating with said bearing means through each of said slots.

3. Apparatus as set forth in claim 1 in which each of said bearing means is comprised of one bearing segment.

4. Apparatus as set forth in claim 1 in which each of said bearing means is comprised of two bearing segments.

5. Apparatus as set forth in claim 2 in which the said outer surface of the bearing mount contains a groove, said resilient means fitting said groove.

References Cited

UNITED STATES PATENTS

| | | | |
|---|---|---|---|
| 305,496 | 9/1884 | Loud | 308—65 |
| 2,832,280 | 4/1958 | Hold et al. | 308—26 |
| 1,541 | 4/1840 | Moore | 308—65 |

FOREIGN PATENTS

| | | |
|---|---|---|
| 12,514 | 5/1898 | Great Britain. |
| 703,052 | 1/1954 | Great Britain. |

EDGAR W. GEOHEGAN, *Primary Examiner.*

U.S. Cl. X.R.

308—65